United States Patent
Bamford et al.

(10) Patent No.: US 6,791,587 B1
(45) Date of Patent: Sep. 14, 2004

(54) METHOD AND COMPONENT FOR NAVIGATING A HIERARCHICAL USER INTERFACE REPRESENTATION

(75) Inventors: Joseph William Bamford, Middlesbrough (GB); David John Clark, Warwickshire (GB); Andrew John Smith, Wellesbourne (GB)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 09/692,388

(22) Filed: Oct. 19, 2000

(30) Foreign Application Priority Data

Mar. 16, 2000 (GB) ............................................. 0006180

(51) Int. Cl.[7] ................................................. G09G 5/00
(52) U.S. Cl. ........................ 345/854; 345/817; 345/818; 345/853; 345/855; 345/856; 345/859; 345/860; 345/861
(58) Field of Search ................................. 345/853–856, 345/842, 859–861, 157, 822, 824, 825, 816–818, 829

(56) References Cited

U.S. PATENT DOCUMENTS

| | | | | |
|---|---|---|---|---|
| 5,327,529 A | * | 7/1994 | Fults et al. .................. | 345/762 |
| 5,664,181 A | * | 9/1997 | Velissaropoulos et al. | 707/102 |
| 5,974,413 A | * | 10/1999 | Beauregard et al. ........... | 707/6 |
| 6,189,012 B1 | * | 2/2001 | Mital et al. ............. | 707/103 R |
| 6,462,762 B1 | * | 10/2002 | Ku et al. ..................... | 345/853 |
| 6,476,828 B1 | * | 11/2002 | Burkett et al. .............. | 345/760 |
| 6,601,192 B1 | * | 7/2003 | Bowman-Amuah .......... | 714/38 |

OTHER PUBLICATIONS

IBM Technical Disclosure Bulletin AN NNRD428120 (Dec. 1, 1999).
'Deckchair holidays' available via the Internet <URL: http://www.deckchair.com>.
'Competitive online insurance quotes' available via the Internet <URL: http://www.insurancenow.co.uk>.
'Cheaper holidays' available via the Internet <URL: http://www.cheaperholidays.com>.
'Eggcard application form' available via the Internet <URL: http//www.egg.com>.

* cited by examiner

Primary Examiner—John Cabeca
Assistant Examiner—Cuong T. Thai
(74) Attorney, Agent, or Firm—David A. Mims, Jr.

(57) ABSTRACT

A navigation manager component cooperable with a user interface renderer is described. The navigation manager manages one or more navigation units and maintains a navigation unit cursor. Each navigation unit is associated with another navigation unit managed by the same navigation manager. The navigation manager provides a range of navigation services, which operate upon the navigation unit cursor. These services include a service to navigate forwards and a service to navigate backwards. These services take into account the associations between navigation units in order to determine the correct sequence of navigation units for forwards and backwards navigation. The services also determine whether the items represented by each navigation unit include eligible items or items for which data entry is incomplete. In this way, navigation units for which all the items represented by the navigation unit are ineligible can be passed over by the navigation services, to that they never become current.

8 Claims, 10 Drawing Sheets

Car Insurance Direct

Person Details

First Name: Roland
Initial: A
Last Name: Merrick
Email:

Car Details

Car Model:
Number Plate *: S

[Cancel] [< Back] [Next >] [Finish]

FIG. 9

Car Insurance Direct

Insurance Details Complete

We will now process your details and send you an insurance quote for your vehicle.

Cancel  < Back  Next >  Finish

FIG. 10

METHOD AND COMPONENT FOR NAVIGATING A HIERARCHICAL USER INTERFACE REPRESENTATION

FIELD OF INVENTION

The present invention relates to a navigation manager component operable in the presentation of user interfaces.

BACKGROUND OF THE INVENTION

Many interactive computer software applications present portions of their user interfaces according to user interface representations of various kinds. These representations may be stored on the computer's storage devices, or may be created as needed by some other part of an application. Traditionally, these representations have been either linear or tabular, and have typically corresponded directly to the way in which the user interface is presented on the particular input/output devices attached to a predefined type of computer system chosen in advance by the application developer.

U.S. Pat. No. 5,327,529 assigned to Geoworks Corporation discloses separating specific user interface implementations from a generic specification of a user interface. Although making no mention of the more recently developed Extensible Mark-up Language (XML), Geoworks does disclose an interpreter cooperable with a user interface controller, where the interpreter selects a specific user interface implementation from a selection of possible specific user interface implementations, such that a selected specific user interface implementation satisfies both specified attribute criteria and hint criteria. If no specific user interface implementation satisfies both the attribute criteria and hint criteria, then the interpreter selects a specific user interface implementation that satisfies the attribute criteria but not all of the hint criteria.

With the increasing use of XML to represent structured data to be exchanged between different systems or parts of a system, applications can make use of an XML hierarchical representation of the user interface ("XML UI representation") written according to a suitable set of XML definitions. An example of such a set of definitions is disclosed in co-pending U.S. Pat. No. application Ser. No. 09/321,700 and Appendix A show an example of an XML UI representation where the reference file, DRUID.dtd, includes the set of definition for the UI representation. The definitions provided encompass various types of data entry which the user may wish to perform, together with means of aggregating those representations into a hierarchical structure. The definitions also allow the circumstances under which an item is eligible for presentation to the user, and the circumstances under which the data entry for the item can be considered complete, and thus ready to be accepted by the application, to be specified in the representation.

A notable feature of the co-pending application, is that the XML UI representation is not intended to reflect the presentation that might take place on any particular input/output device, rather that applications are intended to operate with platform specific renderers which are responsive to a common user interface definition to present the user interface suitably on respective devices with widely differing characteristics. For example, an application or its user interface renderer component "renderer" may present a given user interface on the screen of a traditional desktop personal computer, or on the smaller screen of a palmtop personal organiser device, or on the extremely limited screen of a mobile telephone handset. Presentation may even take place via speech which is produced by a voice response unit across a telephone connection, and thus have no visual presentation portion at all.

Each device or hardware environment will have different presentation capabilities, and will therefore require a different concept of presentation granularity. For example, the personal computer may have the luxury of a relatively large display area on which to present items, allowing it to group many related items together for simultaneous display. Thus, on personal computer displays, a renderer might present the user interface as a sequence of pages, each containing one or more items, with user-selectable choices to move forwards and backwards through the pages, and indeed this is a presentation style which is frequently used by today's desktop personal computer applications. The palmtop device may be significantly more constrained in display area, and so may wish to present fewer items simultaneously. The mobile telephone display and the voice response unit will probably both be so constrained that they are able to present just one item at a time.

It is conceded that the organisation of a hierarchical user interface representation into a linear sequence of units of a particular size is usually supported to some extent by the user interface tool kits available for each device or hardware environment. However, in order for an application, or its renderer, to be able to present a user interface on many different devices and hardware environments, the application must be able to adapt the UI representation into many different linear sequences of units, with the units comprising different sizes of portions of the UI representation according to the capabilities of the hardware, and still be able to manage the navigation forwards and backwards through this sequence in the appropriate manner. It is a complex task to take into account the required forwards and backwards navigation schemes and the eligibility of the items and the completeness of data entry into the items, and also to detect changes in the availability of forwards navigation and backwards navigation, when it is not known in advance how many units there will be, and which units will contain which items.

DISCLOSURE OF THE INVENTION

The present invention provides a navigation manager component cooperable with a renderer adapted to operate a user interface having a hierarchical representation, said hierarchical representation comprising a plurality of items at least some of said items being adapted to contain one or more child items, and at least some of said items being conditionally eligible for display according to the state of another item, each item having a set of attributes indicating:the identity of any parent item of the item; whether the item is eligible for presentation, in that if one or more conditions are specified which determine when the item is to be considered eligible then the or each condition is satisfied; and whether data entry for the item is complete, said navigation manager being adapted to manage an ordered sequence of one or more navigation units, each navigation unit representing one or more items in said hierarchical representation and comprising: means for maintaining a navigation unit cursor identifying one of said navigation units managed by the navigation manager to be the current navigation unit; means for determining if forward navigation is available, comprising means for searching for any navigation unit after the current navigation unit in the sequence representing one or more eligible items, means for determining if the current navigation unit is complete and means for determining if all eligible completable items represented by previous navigation units are complete; means for determining if backwards navigation is available, comprising means for searching for any navigation unit before the current navigation unit representing one or more eligible items; means, responsive to user selection of forwards navigation within said rendered user interface, for updating said navigation unit cursor to be the next eligible navigation unit in said sequence in accordance with the results provided by said means for determining if forward navigation is available; and means, responsive to user selection of backwards navigation within said rendered user interface, for updating said navigation unit cursor to be the previous eligible navigation unit in said sequence in accordance with the results provided by said means for determining if backwards navigation is available.

So in spite of the fact that an application or its renderer is largely tied to the platform on which it operates, and in spite of the fact that navigation may differ for the same application on different platforms, for different applications on the same platform and even from time to time within a given application, the invention provides a platform- and application-independent navigation manager, cooperable with a renderer, or at least that portion of an application, handling a hierarchical UI representation.

In the preferred embodiment, the application or its renderer initially defines a sequence of user interface units, each comprising a portion of the total UI representation with the sizes of those portions ranging from large sections of the overall structure in the case of a personal computer display to single items in the case of the mobile telephone display or voice response unit.

A navigation unit component thus represents a portion of the user interface representation being one or more items from the user interface representation which are to be presented simultaneously. By establishing the relevant properties of the items which it contains, the navigation unit component is able to determine at any time whether any of the items which it contains are eligible for presentation, and whether data entry for any of the items which it contains is incomplete.

The navigation manager manages navigation forwards and backwards through the sequence of navigation units in response to user requests, in order that the user is able to work with the whole user interface by having the various units presented at the appropriate times. The navigation manager determines the required forwards and backwards navigation schemes, including situations where backwards navigation is not a simple inverse of forwards navigation. For example, if the hierarchical UI representation has items organised into several groups of closely related items, and the hardware constraints mean that each group is too large to be represented by a single unit and thus will require several units to represent it, then backwards navigation from the first unit representing one of the later groups may more appropriately yield the first unit of the preceding group, which might establish the user interface context of that preceding group, rather than yielding the last unit of the preceding group, even though that unit is probably the origin of the forwards navigation which yielded the current unit. In this case, the required forwards and backwards navigation schemes are determined according to the structure of the UI representation as well as the sequence of the user interface units in order to produce a satisfactory system of navigation for the user.

Preferably, the navigation manager takes into account which items are eligible for presentation to the user at any time, in order to avoid presenting units in which all the items are ineligible for presentation. It also takes into account which items are items for which the data entry is incomplete, in order to be able to encourage the user to complete data entry for those items before proceeding forwards. Furthermore, forwards navigation will not always be available because there may be no further units in the forwards navigation direction, or all the further units in the forwards navigation direction may be units in which all the items are ineligible for presentation, or there may be items in the current unit for which data entry is incomplete. Similarly, backwards navigation will not always be available because there may be no further units in the backwards navigation direction, or all the further units Was in the backwards navigation direction may be units in which all the items are ineligible for presentation. Thus, when an application is to provide user interface affordances to enable the user to make navigation requests such as forwards navigation and backwards navigation, the navigation manager enables the application to make those affordances available or unavailable from time to time, as forwards navigation and backwards navigation become available or unavailable. Since the eligibility of items and the completeness of data entry into items will typically change at any moment due to user data entry via the user interface, any consequent changes in the availability of forwards navigation and backwards navigation can be reflected immediately in the availability of the corresponding user interface affordances whenever it is feasible to do so.

BRIEF DESCRIPTION OF THE DRAWINGS

Thus, navigation is managed correctly regardless of the manner in which the UI representation is organised into units. The eligibility and completeness of items is taken into account when determining the result of a navigation action, and by signalling the availability of the different types of navigation at all times, presentation of the current navigation state within the user interface is also supported.

FIGS. 3 to 10 illustrate the operation of an application user interface rendered in conjunction with a navigation manager according to the invention.

DESCRIPTION OF THE PREFERRED EMBODIMENTS

Although the invention is not limited to the Java language or JDK, an embodiment of the invention using the Java programming language and Java Development Kit (JDK) will now be described. The embodiment is incorporated into a tool kit comprising a framework of Java classes which enable applications to be constructed. Only the portions of that tool kit which are relevant to the present invention will therefore be described.

Figure 1:
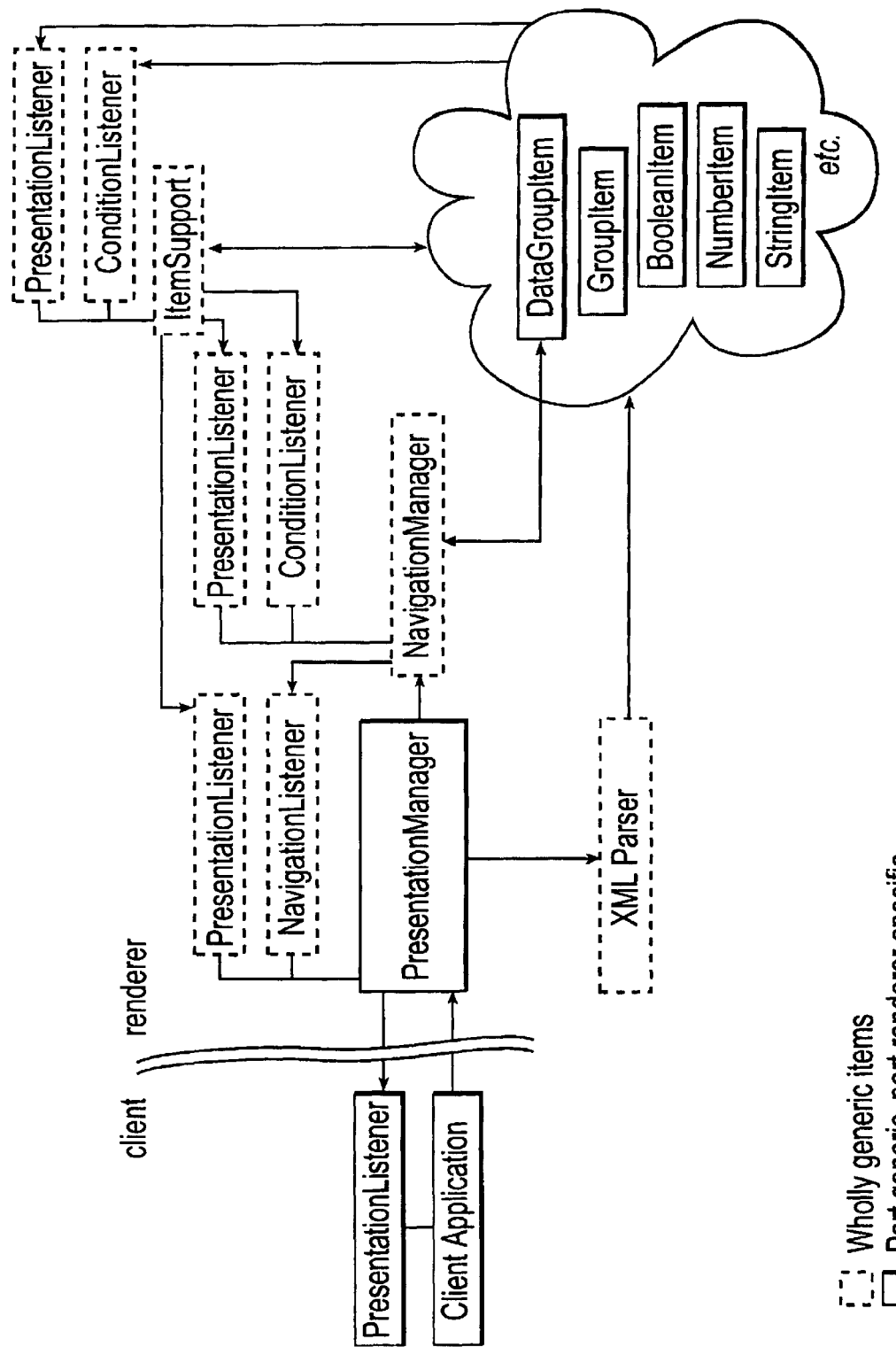
FIG. 1 is a block diagram showing the operational relationship of components of an application including a renderer and a navigation manager according to the invention.

Referring now to FIG. 1, the framework comprises five sections:

1. A collection of item interfaces. These interfaces define programmatic objects, for example, BooleanItem, DateItem etc. which are used to represent the corresponding elements in the XML UI representation, for example the file of Appendix A. Each object includes methods corresponding to each of the attributes and characteristics of these elements.

2. A set of listener interfaces, of which implementations can be attached to various parts of the framework in order to be notified when significant changes occur. These include: a presentation listener interface for listening for data value completion, action activation or selection changes; a condition re-evaluation listener interface; and a navigation listener interface. The listeners are used both internally within the renderer to provide automatic responses to certain key events, and also (optionally) by a client application to be informed of changes which might affect it.
3. An item support interface, which provides services and generic implementations of various features of the item interfaces. By using item support, implementations of the item interfaces do not need to reproduce large amounts of standard program code but can delegate appropriate functions to an item support instance. Other parts of these item interface implementations will necessarily be platform- and presentation-specific, but should still adhere to the defined item interfaces in order to allow generic parts of the framework to work correctly with the hierarchy of item implementations.
4. The presentation manager, which is the primary point of contact between a client application and a renderer built with the framework. The presentation manager is supplied with the XML UI representation including the set of definitions, and is responsible for parsing the XML, interpreting it, building the corresponding hierarchy of implementations of the item interfaces, presenting the UI, and managing user interactions. The presentation manager will also issue notifications when significant events take place which the client application may need to be informed about. The presentation manager function is largely generic, and there are program exits where platform- or presentation-specific function must be supplied to handle the actual starting and stopping of presentation to the user.
5. The navigation manager. This service enables the essentially hierarchical structure of the XML UI representation to be organised linearly in preparation for presentation to a user. Each object in the Presentation Manager created hierarchy corresponding to one of the data items or groups specified in the XML UI representation implements an interface named PresentableItem, described below in relation to FIG. 2. The presentation manager selectively associates these objects with NavigationUnit objects, in order to establish the appropriate groupings for presentation purposes and these NavigationUnit objects are then managed by a single NavigationManager object. The navigation manager is used by the presentation manager both to manage the sequencing of items for presentation and to incorporate the logic to determine completeness and eligibility of each discrete unit of navigation. According to the presentation requirements, it can be used to support Wizard-style presentations, in which the semantics of the interaction are used to build the linear sequence, and it can be used to manage the purely linear presentation of items in environments such as Voice Response Units or devices with highly limited display or interaction capability. In the present embodiment, each NavigationUnit object is associated with a single object implementing PresentableItem. Thus each unit of navigation can correspond with either a single instance of DataItem or GroupItem corresponding to any one of a String, Number, Date, Time or Boolean or a Group tag defined in the user interface representation. This restriction could be relaxed, thereby allowing the groupings for presentation purposes to be different from those defined in the user interface representation.

Figure 2:
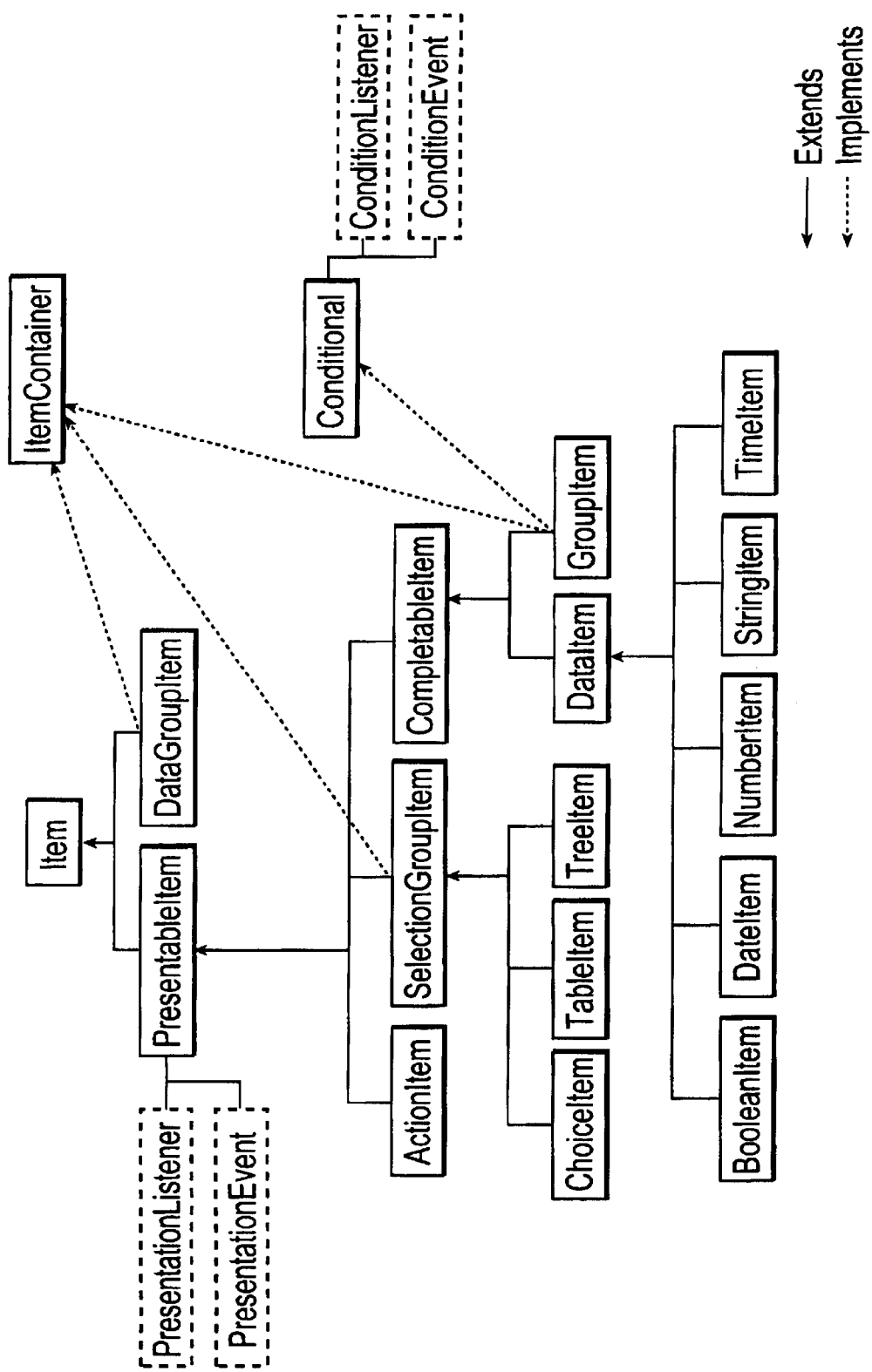
FIG. 2 is class hierarchy diagram illustrating interfaces implemented in a renderer of FIG. 1.

Referring now to FIG. 2, in addition to the PresentableItem interface, other interfaces are defined that model concepts of item validity, completeness, writability, whether it is mandatory that a writable item is provided, and of making the eligibility of one item dependent upon the state of another. Germane to the preferred embodiment are DataItem, CompletableItem and Conditional interfaces. Together these interfaces present a substantial programming task for those seeking to implement them. However, much of the logic required to implement these interfaces is generic to all renderers, and so with the preferred embodiment, a helper class named ItemSupport, FIG. 1, is provided to assist implementors. The logic applied by ItemSupport pertaining to these interfaces is outlined in the appropriate interface method descriptions.

Item

This is the base interface for all the remaining interfaces which represent UI representation elements. It carries methods to access those attributes which are common to all such elements. The methods include:

set/getName( ) to access the element NAME=attribute.

set/getCaption( ) to access a child <CAPTION> element's data.

PresentableItem

This interface extends Item and is implemented by all the objects which represent data items or groups of data items. PresentableItem ensures the provision of the following methods:

void setParentItem(PresentableItem parent);

PresentableItem getParentItem( );

As the renderer processes the XML UI representation, it creates objects corresponding to each of the items and groups. It then ensures that the setParentItem( ) method is called on each object, passing as the parameter the object corresponding to the item which contained this item in the XML UI representation. The item thus specified is then returned on demand by the getParentItem( ) method. The only item which does not get setParentItem( ) called on it is the root of the containment hierarchy, which returns null from getParentItem( ).

boolean isEligible( );

This method returns true if the item is currently eligible for presentation, and false otherwise. The XML UI representation includes a mechanism for defining a condition for the presentation of an item based on the state of another item.

ItemSupport provides a method that tests an item for eligibility according to the following rules:

If the item has a condition applied, for example,

Item-Name="xxx" TEST="SELECTED"

CONDITION="TRUE">, then an aspect of the referenced item, in this case "xxx", defined in the XML UI representation will be tested using one of a defined set of tests, also defined in the XML UI representation. The possible aspects and corresponding tests are as follows:

| Item aspect | Tests |
| --- | --- |
| SELECTED | If the referenced item supports selection, check that its selection state is as defined in the UI representation. |

-continued

| Item aspect | Tests |
| --- | --- |
| VALID | If the referenced item supports validity checking, check that its valid state is as defined in the UI representation. |
| ENABLED | If the referenced item supports enabling, check that its enabled state is as defined in the UI representation. |
| SHOWN | If the referenced item supports showing, i.e. that it may either be visible or invisible, check that its shown state is as defined in the UI representation. |
| VALUE | If a comparative value is supplied in the UI representation, testing proceeds according to the value type for the referenced item. The set of definitions for the UI representation defines several comparative test conditions for the various defined data types. The referenced item value is compared to the item value according to the defined test. |

In addition, if the item is contained within another item, the container's eligibility is tested recursively.

void addPresentationListener(PresentationListener listener);

void removePresentationListener(PresentationListener listener);

These methods allow listeners to be added to and removed from objects which implement this interface. Whenever eligibility or completeness of the item may have changed, due to user input or other actions, the listener is notified. By adding a suitable listener to each of the objects, the NavigationManager, in particular, is thus able to respond appropriately to those changes.

CompletableItem

The set of definitions allows for data items to be defined such that they should notify completeness. This interface extends PresentableItem and is implemented by all the objects which represent such data items. CompletableItem ensures the provision of the following methods:

boolean iscomplete( );

This method returns true if data entry into the item can currently be considered complete, and false otherwise. The set of XML definitions includes a mechanism for defining that a data item should notify completeness. ItemSupport provides a method that tests an item for completeness according to the following rules:

If the item is a data item, and is eligible, and is mandatory, and is either invalid, null, or of zero length, then it is deemed to be incomplete.

If the item contains other items, and any of those items is incomplete, then it is also deemed to be incomplete.

DataItem

This interface extends CompletableItem and is implemented by all the objects which represent data items in the XML UI representation. DataItem ensures the provision of the following methods:

String getvalue( );
void setValue(String value);

UI representation data items, for example, <STRING> should have a child item <VALUE> having a string value. When instantiated, the child item calls setvalue on its parent and the parent data item's value is accessed using getvalue.

boolean isValid( );
void setValid(boolean valid);

The first of these methods returns true if the item is currently valid, and false otherwise. The set of XML definitions defines several data types, and the rules governing how they should be formatted. In addition, value constraints may be applied. These methods relate to the adherence of values to formatting rules and constraints. ItemSupport provides a corresponding method that tests the data item value against criteria specific to the data type. The tests are as follows:

| Data type | Tests |
| --- | --- |
| STRING | The length of the string is compared with any UI representation defined minimum and maximum. |
| DATE | The value is checked against the set of XML definition's formatting rules for dates (ISO 8601), and compared against any UI representation defined earliest and latest date. |
| TIME | The value is checked against the set of XML definition's formatting rules for times (ISO 8601), and compared against any UI representation defined earliest and latest time. |
| NUMBER | The value is checked to ensure it is a valid number representation, and then its precision is checked against any UI representation defined precision. Finally, the value is compared to any UI representation defined minimum and maximum. |
| Container | For any UI representation item that is acting as a container, its validity depends on the validity of its contained items, so each contained item is checked recursively. boolean isReadOnly( ); void setReadOnly(boolean readOnly); The first of these methods returns true if the item is read only, and false otherwise. The set of XML definitions allows data items to be specified as read only, indicating that the data item value should not change. These methods relate to this facility. boolean isMandatory( ); void setMandatory (boolean mandatory); The first of these methods returns true if the item is mandatory, and false otherwise. The set of XML definitions allows data items to be flagged as mandatory, indicating that a value must be provided. These methods relate to this facility. |

GroupItem

This extends CompleteableItem, ItemContainer and Conditional, and represents XML UI representation <GROUP> elements. It adds no further methods but the methods of ItemContainer are as follows:

void addItem (PresentableItem item);
void removeItem (PresentableItem item);
PresentableItem [] getItems( );

Thus, when a child element of a GroupItem is instantiated, either the child items constructor class or an ItemFactory instantiating the elements, can add the child item to an array of items on the container. Similarly, setParent can be called on the child element.

The container in turn sets itself as a presentation listener on the child element, so that changes in child elements are therefore propagated up through the hierarchy of objects representing the user interface. Thus when a change happens to a child element, any listeners to antecedents of the child element will be notified and can take action accordingly. Although not strictly required by the interface, the implementation of this protocol within containers, ensures changes in elements are immediately notified to listeners who may need to take action.

Conditional

This interface is implemented by all the objects which represent data items in the UI representation and that are conditionally presented according to the state of another item. In the present embodiment, only GroupItems implement conditional, as these are the only container objects implementing conditional, although the invention is not limited to this implementation. Conditional ensures the provision of the following methods:

String getItemName( );
void setItemName(String itemName);
    These methods return and set the NAME of the referenced item on which the condition and test are to be applied, as defined in the XML UI representation.
String getvalue( );
void setValue(String value);
    These methods return and set the VALUE on which the condition and test are to be applied.
int getCondition( );
void setCondition(int condition);
    These methods return and set a constant representing one of the conditions (CONTAINS, TRUE, FALSE, EQ, NE, GE, LE, GT, LT) defined in the set of definitions.
int getTest( );
void setTest(int test);
    These methods return and set a constant representing one of the tests (ENABLED, SELECTED, SHOWN, VALID, VALUE) defined in the set of definitions.
void addConditionListener(ConditionListener listener);
void removeConditionListener(ConditionListener listener);
    This methods allows listeners to be added to and removed from objects which implement this interface. Whenever the result of evaluating a condition might change, due to user input or other actions, the listener is notified. By adding a suitable listener to each of the objects, the NavigationManager is thus able to respond appropriately to those changes.

NavigationManager

Using any implementation of the above interfaces to instantiate a hierarchy of renderer specific items based on a given XML UI representation, an instance of NavigationManager can be employed to provide presentation and navigation support for those items. Any given renderer first determines the items from the hierarchy that are to act as points of navigation, and then it provides the NavigationManager with these items in the correct sequence.

In the preferred embodiment, NavigationManager encapsulates each item passed from the renderer in an instance of NavigationUnit, an inner class that is private to NavigationManager. NavigationManager builds an array of NavigationUnits, and maintains an index into this array to keep track of the "current" navigation unit.

The renderer uses the NavigationManager services to present and keep up to date the available navigation options, and to present the appropriate item(s) for the current navigation point. The methods on NavigationManager for this purpose are:

NavigationManager(DataGroupItem owner);
    The NavigationManager constructor is supplied with the XML UI item that is the root of all items in the XML UI representation.
void addNavigationListener(NavigationListener listener);
void removeNavigationListener(NavigationListener listener);
    The NavigationListener interface defines the means by which an interested party may be informed of navigation state changes for a given NavigationManager, using the Listener design pattern well known to those skilled in the art. This is the means by which a renderer specific user interface can reflect navigation options according to their current availability.void
addItem(PresentableItem item); void addItem (PresentableItem item,
PresentableItem previousItem);
    The supplied item is added to the set of items managed by this NavigationManager. If supplied, the previousItem is set as the item to which the NavigationManager should reverse navigate from this item. If previousItem is not supplied it is set to the item previously added. The exact sequence of events is as follows:
        Any previousItem is validated to ensure it has already been added.
        A new NavigationUnit is constructed with the item and the index of the default or provided previousItem.
        The new NavigationUnit is added to the array of NavigationUnits.
void reset( );
    Resets the NavigationManager's navigation cursor to the first eligible item, and then notifies NavigationListeners of a change in navigation point.
PresentableItem getCurrent( );
    Returns the item at the current cursor position. This allows a renderer specific user interface to obtain and present the current renderer specific item and thereby any of its children.
boolean allowNext( );
    Returns true if the current item is complete, and all previous shown eligible completable items are complete, and there is at least one shown eligible item following this item.
    To determine this, NavigationManager iterates backwards through its NavigationUnits from the current unit calling isEligible( ) on each unit to discover eligibility, and iscomplete( ) on each eligible unit. Iteration stops as soon as any eligible unit is found to be incomplete. If all preceding eligible units are complete, any following units are iterated through until an eligible unit is discovered.
PresentableItem navigateNext( );
    This method checks the legality of forward navigation using the same logic as described in allowNext( ). If legal, the current item is set to the discovered eligible unit, and NavigationListeners are notified of a change in navigation point.

This method returns the new current item, or null if no navigation has occurred. However, in most cases renderers will ignore this return value and rely on notification of navigation changes to trigger any updates.

boolean allowPrevious( );
   Returns true if there is at least one previous shown eligible item.
To determine this, NavigationManager will iterate backwards through its NavigationUnits from the previous unit calling isEligible( ) until an eligible unit is found.

PresentableItem navigatePrevious( );
   Returns the previous shown eligible item and updates the navigation cursor, or returns null if allowPrevious( ) would return false. This method checks the legality of backward navigation using the same logic as described in allowPrevious( ).
   If legal, the current item is set to the previous unit as defined when the current item was added, and NotificationListeners are notified of a change in navigation point.
   This method again returns the new current item, or null if no navigation has occurred. However, in most cases renderers will ignore this return value and rely on notification of navigation changes to trigger any updates.

boolean allowComplete( );
   Returns true if all shown eligible completable items are complete. To determine this, NavigationManager iterates through all of its NavigationUnits calling isEligible( ) on each unit to discover eligibility, and isComplete( ) on each eligible unit. Iteration stops as soon as any eligible unit is found to be incomplete.

boolean allowCancel( );
   Returns true since it is assumed that the user is always allowed to terminate the user interface. Included for completeness.

NavigationUnit

As mentioned above, NavigationUnit is a private inner class of NavigationManager that encapsulates a PresentableItem, and identifies an index for backwards navigation purposes, both provided with the constructor. NavigationManager uses the following NavigationUnit methods in checking and performing navigation:

NavigationUnit(PresentableItem item, int previousindex);
   The supplied item and previousindex are stored. If the item implements Conditional, or is contained within an item that implements Conditional, the NavigationUnit adds itself as a ConditionalListener to the item or navigates up the object hierarchy to find the closest containing Conditional implementation and adds itself as a ConditionalListener to this item. It also adds itself as a PresentationListener to the item.

Whenever condition change or completion state change notifications are received, the NavigationUnit fires a navigation state change on behalf of the NavigationManager.

boolean isEligible( );
  Returns true if the encapsulated item is shown and is eligible. To determine this, PresentableItem.isShown( ) and PresentableItem.isEligible( ) are called on the item.
  Implementations of PresentableItem may use the services of ItemSupport to assist in determining eligibility.

boolean iscomplete( );
  Returns true if the encapsulated item is a CompletableItem and is complete. To determine this, CompletableItem.isComplete( ) is called on the item.

Implementations of CompletableItem may use the services of ItemSupport to assist in determining completeness Navigation Manager Example The following example provides a demonstration of a renderer that uses the Navigation Manager according to the preferred embodiment. The XML UI representation for the content is shown in Appendix A, where the elements that directly pertain to the Navigation Manager are in bold. To facilitate understanding of the relationship between the renderer and the Navigation Manager, each stage of the process is provided with a screen shot and a relevant description of the main methods that are used. All interface methods are in bold.

Figure 3:
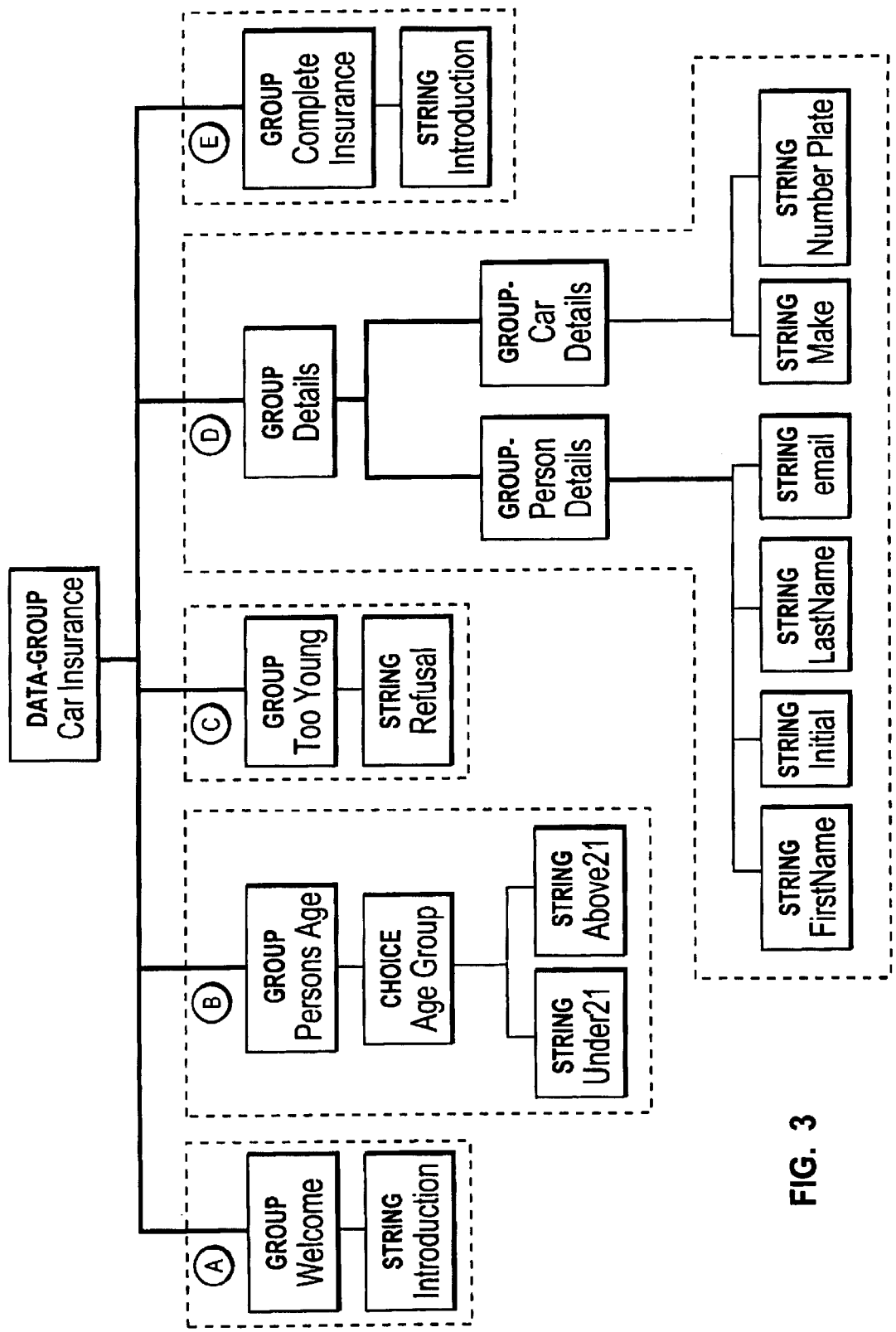

The renderer parses the XML UI representation using a conventional XML parser and creates its own DOM (Document Object Model), shown in FIG. 3. Once completed, the renderer creates the Navigation Manager, calling the method: NavigationManager(DataGroupItem owner). This particular renderer has decided that each top-level group "Welcome", "Person Age", "Too Young", "Details", "Complete Insurance") will be displayed as a separate page. To achieve this, the renderer adds each top-level Group in order of occurrence to the Navigation Manager using the NavigationManager method: addItem(PresentableItem item), and each navigation unit is listed in FIG. 3 as A, B, C, D, E. The renderer does not explicitly identify the target for backwards navigation from each Group because it accepts the default which is the previous Group.

Within the Navigation Manager, the navigation units instantiated for Groups C, D and E will detect that each of these items implement the Conditional interface and so and will thus add themselves as respective condition listeners to their encapsulated objects.

Next the Navigation Manager is initialised to the first shown eligible group: reset( ). The renderer creates a main window that will at all times show the presentable item (and any children thereof) that the Navigation Manager signifies as the current item. At the base of the window, the renderer has provided buttons to demonstrate all methods of navigation that are provided by the Navigation Manager. The state of these buttons will always represent the current state of navigation. To keep the button states current, the renderer creates a Navigation Listener and supplies it to the Navigation Manager using the method: addNavigationListener(NavigationListener listener). The Navigation Listener is called every time the navigation state changes. On each occurrence, the renderer sets the current state of the buttons 'Cancel', 'Back', 'Next>', and 'Finish' with reference to the corresponding Navigation Manager methods allowCancel( ), allowPrevious( ), allowNext( ), and allowComplete( ).

Figure 4:
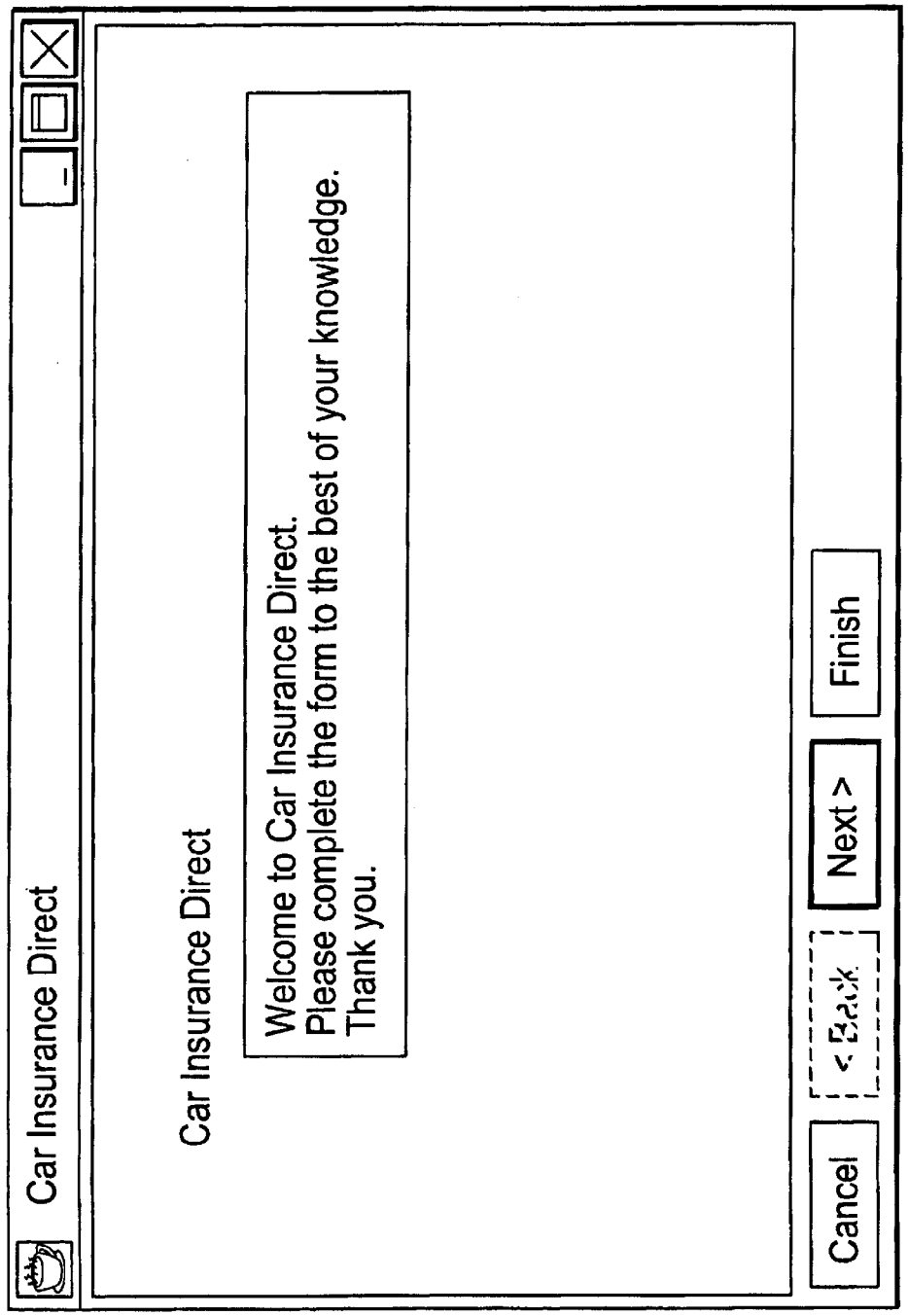

FIG. 4 shows the first navigable item (A). The '< Back' button has been disabled because allowPrevious( ) indicates that there is no previous shown eligible item. The 'Next>' button is enabled because allowNext( ) indicates that there is a subsequent shown eligible item, and that there are no invalid mandatory items amongst the children of the current item. 'Finish' is enabled because allowComplete( ) indicates that all shown eligible items are complete. The 'Cancel' button is enabled because allowCancel( ) indicates that the current interaction may be terminated.

Figure 5:

FIG. 5 shows the result of the 'Next' button being pressed, which causes the renderer to call navigateNext( ). A navigation state changed notification is issued by the Navigation Manager. On receipt of this notification the renderer updates the display to reflect the new current item, in this case item (B), and updates the navigation buttons to reflect any change in navigation state. All subsequent navigable items (C) to (E) are conditional. Navigable item (C) is the next in sequence and is eligible only if the 'Under>' choice is selected. Since this is the case, the 'Next>' button is enabled.

Figure 6:
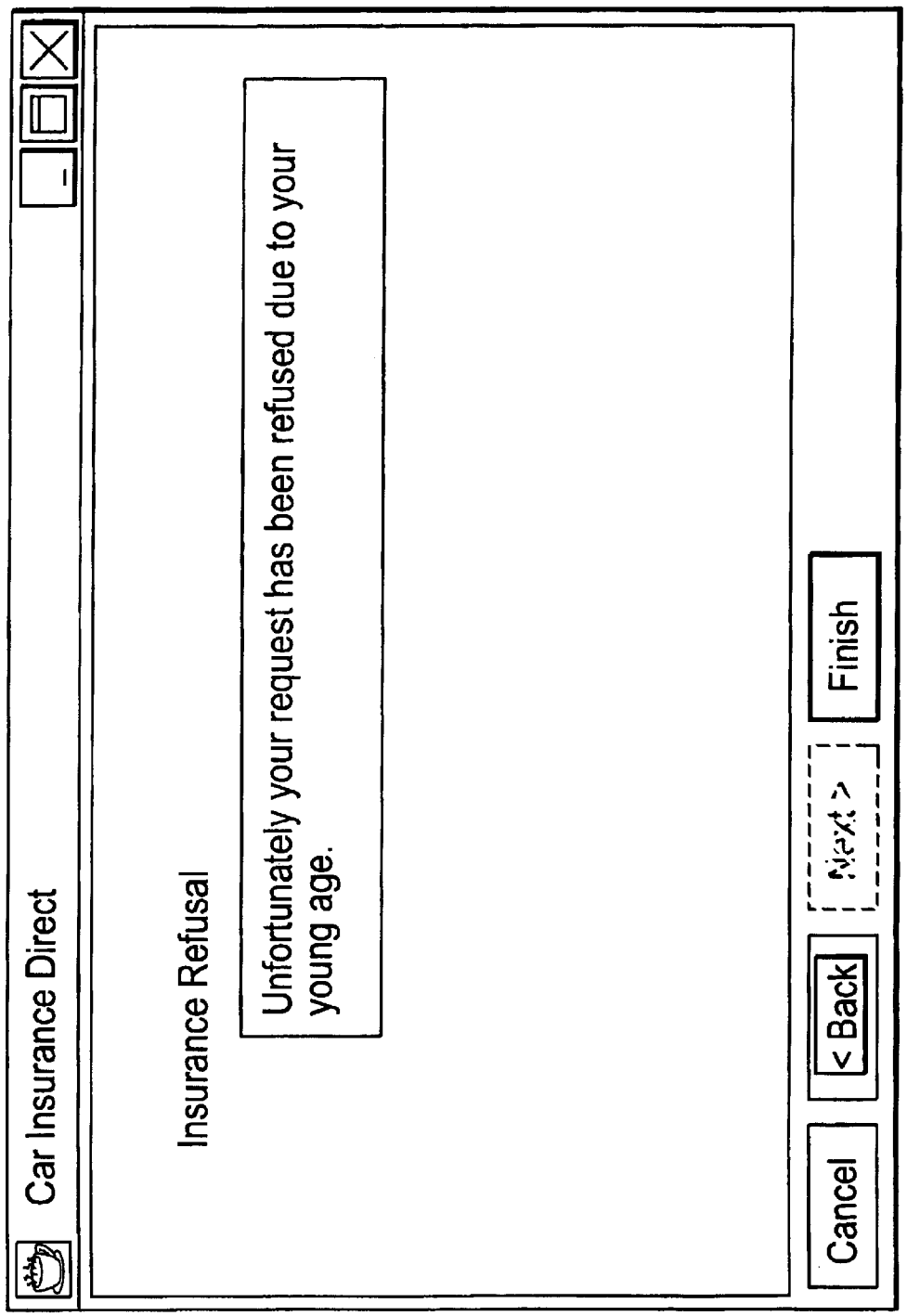

FIG. 6 shows the result of the 'Next>2 button being pressed with the 'Under 21 ' choice selected. As in the case of FIG. 5, the '< Back' button has been enabled because allowPrevious( ) indicates that there is at least one previous shown eligible item. The 'Next >' button is disabled because allowNext( ) indicates that there are no subsequent shown eligible items (D and E are conditional upon "Above21" being selected, and so are ineligible). 'Finish' is enabled because allowComplete( ) indicates that all shown eligible items are complete.

When the '< Back' button is pressed the renderer calls navigatePrevious( ). Since the previous navigable item (B) is eligible, it becomes the current item and a navigation state changed notification is issued.

Figure 7:

FIG. 7 shows item (B) again, with the 21 or above' choice selected. When "21 or above" is selected, the condition upon which navigable items (D) and (E) are eligible changes. This is detected by the Navigation Manager because navigation unit (B) is a condition listener on this GroupItem (B) and it issues a navigation state change. On receipt the renderer checks the status of the navigation buttons by calling the allowNext, allowPrevious, allowComplete and allowCancel methods on NagivationManager. The 'Finish' button is now disabled because allowComplete( ) indicates that there is at least one shown eligible mandatory incomplete item. In this case it is the 'Number Plate' item, which is part of the containment hierarchy of navigable item (D).

When the 'Next >' button is pressed the renderer calls navigateNext( ). The next navigable item in sequence is (C), but this is now ineligible because the condition of item 'Under21' being selected is not satisfied. However, navigable item (D) is now eligible, and so becomes the current item.

Figure 8:

FIG. 8 shows the result of the 'Next >' button being pressed with the '21 or above' choice selected. The Group item "Details" contains two inner Groups "Person Details" and "Car Details"). The Group "Car Details" contains a mandatory field "Number Plate". The 'Next >' and 'Finish' buttons are disabled because the "Number Plate" field is empty.

FIG. 9 shows the result of text entry into the mandatory field. When text is entered into the "Number Plate" field, the mandatory field is considered complete. This change is detected by the containing GroupItem "Car Details", which in turn raises a PresentationEvent on its listeners, one of which is the GroupItem "Details". This group again raises a PresentationEvent, which is detected by its encapsulating navigation unit within the Navigation Manager. This causes a navigation state change to be issued and on receipt the renderer checks the status of the navigation buttons. The 'Next >' button is enabled because allowNext( ) indicates that there is at least one subsequent shown eligible item (E), and no incomplete mandatory items as part of the current navigable item. The 'Finish' button is enabled because allowComplete( ) indicates that there are no incomplete mandatory items.

When the 'Next >' button is pressed the renderer calls navigateNext( ). The next navigable item in sequence is (E), which is eligible because the condition of item 'Above21' being selected is satisfied. This becomes the current navigable item.

FIG. 10 shows the result of the 'Next >' button being pressed. The 'Next >' button is disabled because allowNext( ) indicates that there are no subsequent eligible items. 'Finish' is enabled because allowComplete( ) has indicated that all shown eligible mandatory items are complete.

APPENDIX A

```
<?xml version="1.0" ?>
<!DOCTYPE DRUID SYSTEM "DRUID.dtd">
<DRUID>
<DATA-GROUP NAME="Car Insurance">
    <CAPTION>Car Insurance Direct</CAPTION>
    <GROUP NAME-"Welcome">
        <CAPTION>Car Insurance Direct</CAPTION>
        <STRING NAME="Introduction" READ-ONLY="TRUE"
OPTIMUM-LENGTH="29" OPTIMUM-SIZE="3">
            <VALUE>
               Welcome to Car Insurance Direct. Please complete
the form to the best of your knowledge.
               Thank you.
            </VALUE>
        </STRING>
    </GROUP>
    <GROUP NAME-"Persons Age">
        <CAPTION>Person Details</CAPTION>
            <CHOICE NAME="Age Group" OPTIMUM-SIZE="2"
SELECTION-POLICY="SINGLE">
                <CAPTION>Your Age Group</CAPTION>
                <STRING NAME="Under21">
                    <VALUE>Under 21</VALUE>
                </STRING>
                <STRING NAME="Above21">
                    <VALUE>21 or above</VALUE>
                </STRING>
            </CHOICE>
        </GROUP>
        <GROUP NAME="Too Young" ITEM-NAME="Under21"
TEST="SELECTED" CONDITION="TRUE">
            <CAPTION>Insurance Refusal</CAPTION>
            <STRING NAME="Refusal" READ-ONLY- "TRUE"
```

APPENDIX A-continued

```
OPTIMUM-LENGTH="27" OPTIMUM-SIZE="2">
            <VALUE>Unfortunately your request has been
refused due to your young age.</VALUE>
          </STRING>
      </GROUP>
      <GROUP NAME="Details" ITEM-NAME="Above21"
TEST="SELECTED" CONDITION="TRUE">
          <GROUP NAME="Person Details">
            <CAPTION>Person Details</CAPTION>
            <STRING NAME="FirstName" OPTIMUM-LENGTH="10">
                <CAPTION>First Name</CAPTION>
                <VALUE>Roland</VALUE>
            </STRING>
            <STRING NAME="Initial" MAX-LENGTH="1">
                <CAPTION>Initial</CAPTION>
                <VALUE>A</VALUE>
            </STRING>
            <STRING NAME="LastName" OPTIMUM-LENGTH="10">
                <CAPTION>Last Name</CAPTION>
                <VALUE>Merrick</VALUE>
            </STRING>
            <STRING NAME="email" OPTIMUM-LENGTH="10">
                <CAPTION>Email</CAPTION>
            </STRING>
      </GROUP>
          <GROUP NAME="Car Details">
          <CAPTION>Car Details</CAPTION>
          <STRING NAME="Make" OPTIMUM-LENGTH="10">
                <CAPTION>Car Model</CAPTION>
          </STRING>
          <STRING NAME="Number Plate" MANDATORY="TRUE"
MAX-LENGTH="8">
                <CAPTION>Number Plate</CAPTION>
          </STRING>
          </GROUP>
      </GROUP>
      <GROUP NAME="Complete Insurance" ITEM-NAME-"Above21"
TEST="SELECTED" CONDITION="TRUE">
          <CAPTION>Insurance Details Complete</CAPTION>
          <STRING NAME="Completion" READ-ONLY="TRUE"
OPTIMUM-LENGTH="27" OPTIMUM-SIZE="2">
            <VALUE>We will now process your details and
send you an insurance quote for your vehicle.</VALUE>
          </STRING>
      </GROUP>
</DATA-GROUP>
<WIZARD></WIZARD>
</DRUID>
```

What is claimed is:

1. A navigation manager component connected to a renderer to operate a user interface having a hierarchical representation, said hierarchical representation comprising a plurality of items at least some of said items contain one or more child items, and at least some of said items being conditionally eligible for display according to the state of another item, each item having a set of attributes indicating:

the identity of any parent item of the item; whether the item is eligible for presentation, in that if one or more conditions are specified which determine when the item is to be considere eligible then the condition is satisfied; and whether data entry for the item is complete, said navigation manager being adapted to manage an ordered sequence of one or more navigation units, each navigation unit representing one or more items in said hierarchical representation and comprising:

means for maintaining a navigation unit cursor identifying one of said navigation units managed by the navigation manager to be the current navigation unit;

means for determining if forward navigation is available, comprising means for searching for any navigation unit after the current navigation unit in the sequence representing one or more eligible items, means for determining if the current navigation unit is complete and means for determining if all eligible completable items represented by previous navigation units are complete;

means for determining if backwards navigation is available, comprising means for searching for any navigation unit before the current navigation unit representing one or more eligible items;

means, responsive to user selection of forwards navigation within a rendered user interface, for updating said navigating unit cursor to be the next eligible navigation unit in said sequence, and means, responsive to user selection of backwards navigation within said rendered user interface, for updating said navigation unit cursor to be the previous eligible navigation unit in said sequence.

2. A navigation manager according to claim 1 for determining if user interface navigation can be completed including means for determining if all eligible and completable items represented by said sequence of navigation units are complete.

3. A navigation manager according to claim 1 in which each navigation unit comprises a first attribute associable with a first navigation unit managed by the navigation manager, and wherein said means for searching for any navigation unit after the current navigation unit in the sequence is adapted to initiate searching at said first navigation unit.

4. A navigation manager according to claim 1 in which each navigation unit comprises a second attribute associable with a second navigation unit managed by the navigation manager, and wherein said means for searching for any navigation unit before the current navigation unit in the sequence is adapted to initiate searching at said second navigation unit.

5. A navigation manager according to claim 1 wherein an item is considered complete in that the item, if mandatory, has had a value entered, and in that the item, if subject to one or more constraints and validity checks, has had a value entered which conforms to the constraint and for which the validity check confirms the value to be valid.

6. A navigation manager according to claim 1 in which each navigation unit is responsible to notifications from respective represented items regarding changes through user interaction in the eligibility of said represented items and the completeness of said represented items, to cause said navigation manager to determine the availability of forwards and backwards navigation and to issue notification wherever the availability of forwards and backwards navigation changes.

7. A computer program product comprising computer program code stored on a computer readable storage medium for, when executed on a computing device, managing navigation within a user interface, the program code comprising the navigation manager component of claim 1.

8. A computer program product stored on a computer readable medium including renderer component adapted to operate a user interface having a hierarchical representation, and the navigation manager component of claim 1.

* * * * *

UNITED STATES PATENT AND TRADEMARK OFFICE
CERTIFICATE OF CORRECTION

PATENT NO. : 6,791,587 B1
DATED : September 14, 2004
INVENTOR(S) : Bamford et al.

Page 1 of 1

It is certified that error appears in the above-identified patent and that said Letters Patent is hereby corrected as shown below:

Column 13,
Line 4, please delete "the 'Under>' choice" and replace it with -- the 'Under 21' choice --:
Line 6, please delete "the 'Next>2 button" and replace it with -- the 'Next>' button --:
Line 19, please delete "the 21 or" and replace it with -- the '21 or --.

Column 15,
Line 65, please delete "forward" and replace it with -- forwards --.

Signed and Sealed this

First Day of March, 2005

JON W. DUDAS
*Director of the United States Patent and Trademark Office*